United States Patent [19]
Grube et al.

[11] Patent Number: 5,613,215
[45] Date of Patent: Mar. 18, 1997

[54] METHOD OF TRANSMITTING SECURITY CODES TO COMMUNICATION UNITS

[75] Inventors: Gary W. Grube, Palatine; Timothy W. Markison, Hoffman Estates; Susan L. Lukasik, Lombard, all of Ill.

[73] Assignee: Motorola, Inc., Schaumburg, Ill.

[21] Appl. No.: 230,997

[22] Filed: Apr. 21, 1994

[51] Int. Cl.$^6$ ...................................................... H04Q 7/20
[52] U.S. Cl. ........................... 455/54.2; 455/33.1; 379/58; 379/59
[58] Field of Search .................................. 455/33.4, 54.1, 455/89, 33.1, 53.1, 54.2; 340/825.34, 825.31; 379/58, 59

[56] References Cited

U.S. PATENT DOCUMENTS

| | | | |
|---|---|---|---|
| 4,955,049 | 9/1990 | Ghisler | 379/58 |
| 4,964,163 | 10/1990 | Berry | 380/23 |
| 4,992,783 | 2/1991 | Zdunek et al. | 340/825.34 |
| 5,309,501 | 5/1994 | Kozik et al. | 379/60 |
| 5,335,265 | 8/1994 | Cooper et al. | 379/60 |
| 5,337,345 | 8/1994 | Cassidy et al. | 455/54.2 |
| 5,420,910 | 5/1995 | Rudokas et al. | 379/59 |
| 5,483,465 | 1/1996 | Grube et al. | 455/33.1 |

FOREIGN PATENT DOCUMENTS 3441724  5/1986  Germany .................................. 379/59

*Primary Examiner*—Edward F. Urban
*Attorney, Agent, or Firm*—Susan L. Lukasik

[57] ABSTRACT

When it is desired to transmit important or secure information to one or more communication units, a message is transmitted (200) to only valid communication unit ID codes. The message requests an acknowledgment transmission from the communication unit, including the communication unit's ID code. When no acknowledgment is received for a particular ID code, the message is transmitted again after a period of time (204). When only one acknowledgment is received for a particular ID code, the important or secure information is then transmitted (206) to that particular ID code. When more than one acknowledgment is received for a particular ID code, no important or secure information is transmitted to that particular ID code, and the ID code is flagged (207) as a potential unauthorized ID code.

13 Claims, 2 Drawing Sheets

5,613,215

METHOD OF TRANSMITTING SECURITY CODES TO COMMUNICATION UNITS

FIELD OF THE INVENTION

This invention relates to radio frequency (RF) communication systems, including but not limited to, reprogramming of information in communication units within RF communication systems.

BACKGROUND OF THE INVENTION

Communication systems with over-the-air-programming or reprogramming of system information are known in the art. Such systems quite often reprogram information such as talk groups that are used within communications. The reprogramming information usually includes information that will be used to identify which communication units of the communication system are to be reprogrammed within the system. Quite often this information is the individual identification (ID) that programmed within each radio unit. When it is desired to reprogram, for example a talk group within a communication unit, the units individual ID is transmitted as part of a message including the new talk group that will be reprogrammed into the communication unit. Such a method is very convenient and time efficient, because information transmitted in such a message quite often takes milliseconds to arrive to the communication unit, whereas if the communication unit must be brought in for such reprogramming, that process may take hours, days, and even weeks, depending on the back up of programming at the particular site.

One drawback of over-the-air reprogramming, however, is that such information may be received by any communication unit that can receive information on that channel. Consequently, information that is reprogrammed over the air may be stolen and used in unauthorized units for various dishonest endeavors including eavesdropping and using of communication resources without paying for them. As a result, sensitive information such as unit identification codes and security codes are not reprogrammed over-the-air unless they are encrypted in some fashion. Various forms of encryption of RF signals exist, although adding such a feature to a communication unit is quite expensive, particularly if more than a minimal amount of security is desired.

When unauthorized communication units are accessing a communication system, the efficiency of such systems decreases because of the additional communication traffic added to the system. The amount of additional traffic is indeterminable for obvious reasons, and thus it is difficult to make adjustments to help correct for the situation. Thus, authorized users suffer in slower throughput of their communication requests as a result of unauthorized use of the system.

Accordingly, there is a need for a method of reprogramming information over RF channels such that information may not be easily intercepted for unauthorized use.

DESCRIPTION OF THE PREFERRED EMBODIMENT

The following describes an apparatus for and method of transmitting security codes to communication units. When it is desired to transmit important or secure information to one or more communication units, a message is transmitted to only valid communication unit ID codes. The message requests an acknowledgment transmission from the communication unit, including the communication unit's ID code. When no acknowledgment is received for a particular ID code, the message is transmitted again after a period of time. When only one acknowledgment is received for a particular ID code, the important or secure information is then transmitted to that particular ID code. When more than one acknowledgment is received for a particular ID code, no important or secure information is transmitted to that particular ID code, and the ID code is flagged as a potential unauthorized ID code.

In the present invention, a request for an acknowledgment is transmitted to a communication unit via a wireless communication system, wherein the request includes a unique ID code of the communication unit. When only one acknowledgment is received for the unique ID code, a security code is transmitted to the communication unit via the wireless communication system. When more than one acknowledgment is received for the unique ID code, flagging the unique ID code is flagged as a potential unauthorized ID. In addition, when no acknowledgment is received, after waiting a predetermined time period, the request for an acknowledgment is retransmitted. The flagged unique ID code is sent to a system manager. A response including instructions is received from the system manager, and the instructions are performed. The instructions may include disabling a radio using the unique ID code and/or reprogramming the radio using the unique ID code to a default group and denying access by the radio to the wireless communication system.

Figure 1:
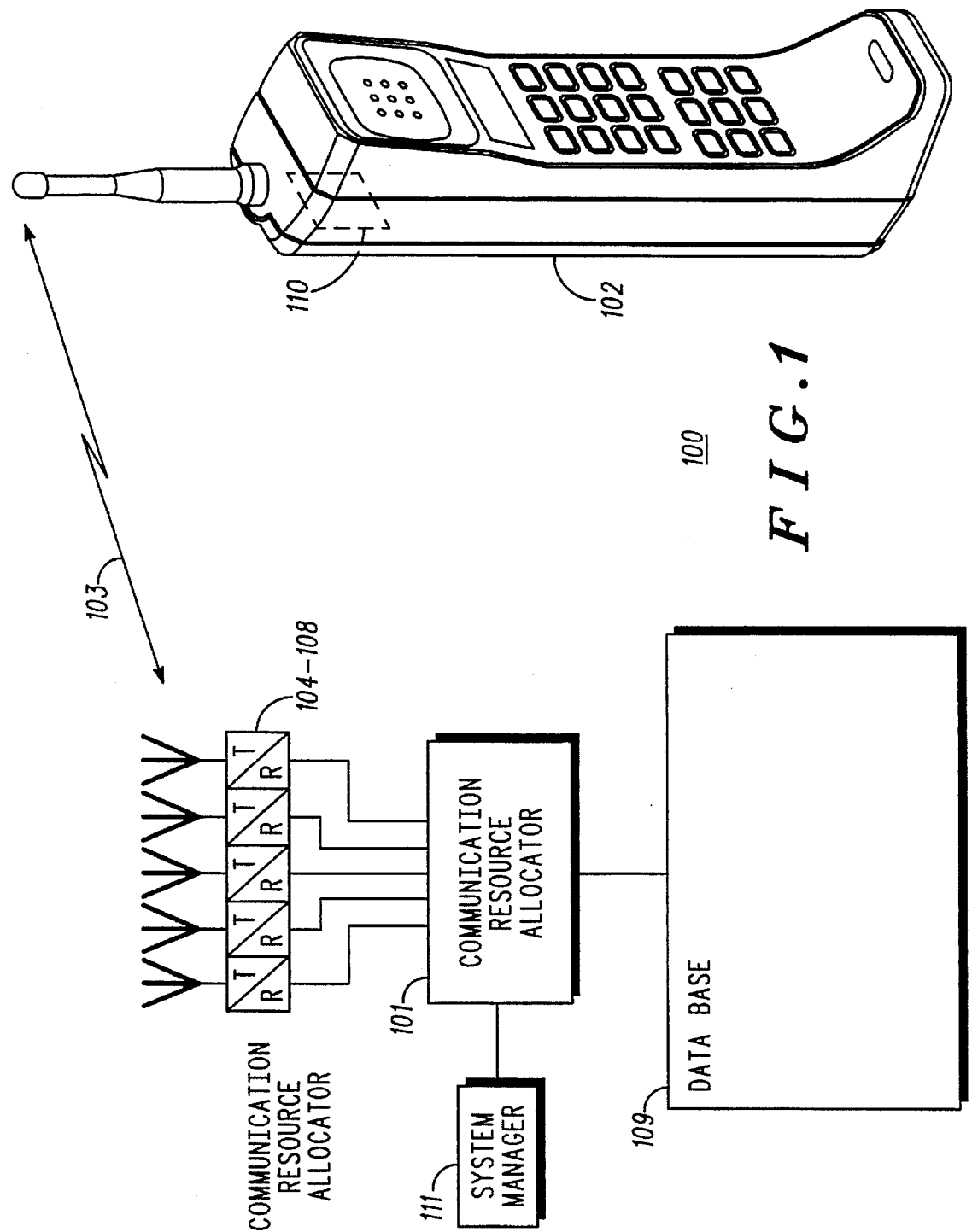
FIG. 1 is a block diagram of a communication system in accordance with the invention.

FIG. 1 illustrates a block diagram of a communication system 100 that includes a communication resource allocator 101 (or central controller), a plurality of communication units 102 (one shown for simplicity), a plurality of communication resources 103 (one shown for simplicity), repeaters 104–108, a database 109, and a system manager 111. In such a system, one of the repeaters 104–108 is designated as a control channel, while the remaining channels are designated as working channels. In operation, a communication unit 102, which has built-in memory 110, transmits a service request via a communication resource of the control channel to the central controller 101. Upon receiving the service request, the central controller 101 determines whether the communication unit is authorized to access the system and whether the communication unit has requested a service to which it has subscribed. If both of the previous inquiries are answered affirmatively, the central controller 101 processes the request. The communication unit may be a Motorola SABER radio, SPECTRA radio, or any other type of portable or mobile radio that operates within a communication system. The central controller 101 may be a Motorola Zone Controller, while the system manager 111 may be a Motorola Smartzone Manager and the repeaters 104–108 may be Quantar repeaters.

Figure 2:
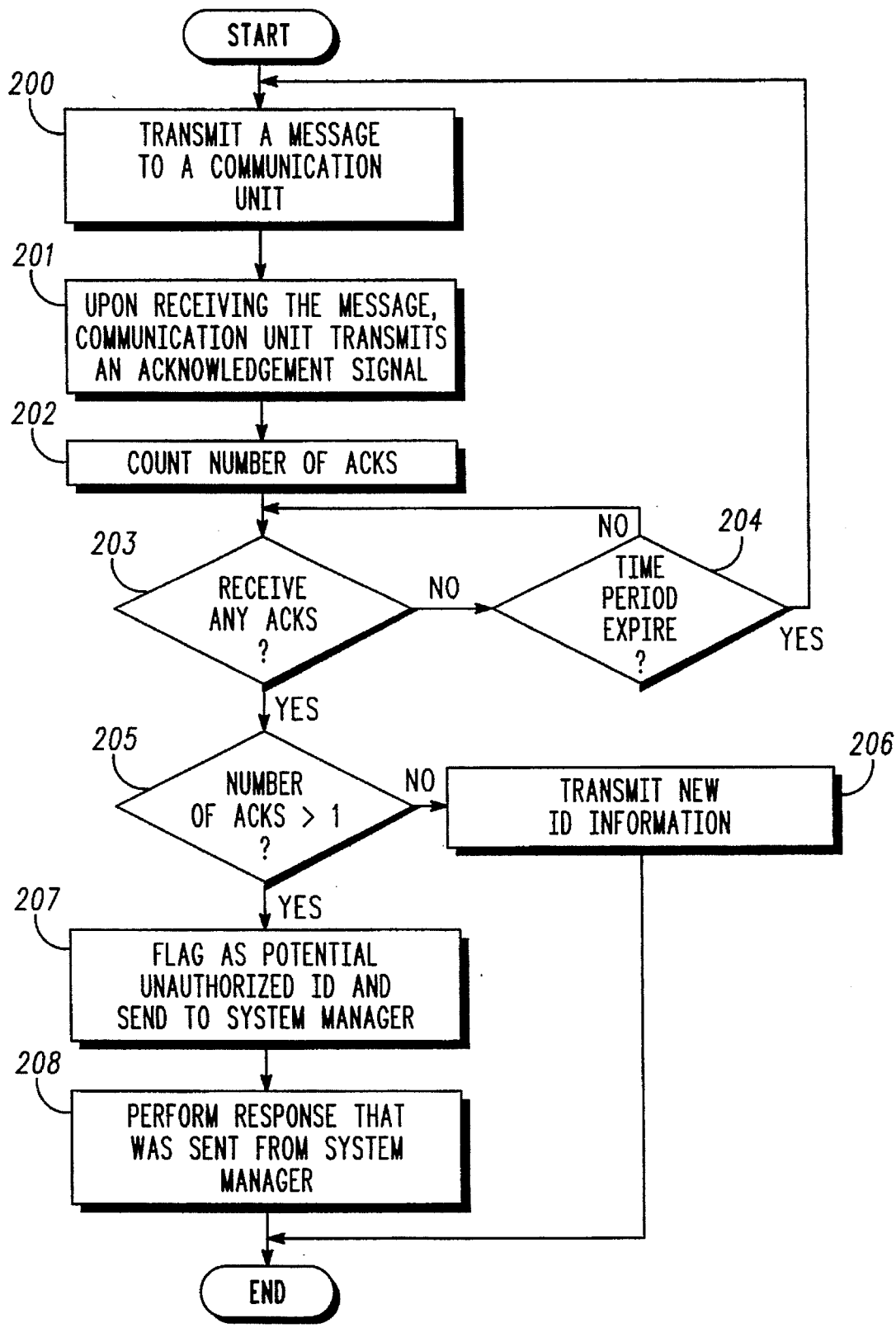
FIG. 2 is a flow chart showing a method of transmitting a new security code to a communication unit in accordance with the invention.

A flow chart showing a method of transmitting a new security code to a communication unit is shown in FIG. 2. At step 200, a message is transmitted to one or more communication units. Few messages should be sent, so as not to cause excessive traffic in the system and to prevent multiple units from simultaneously transmitting acknowledgments. That message includes the communication unit's identification (ID), and a request for an acknowledgment. The request for the acknowledgment also requests that the communication unit's ID is transmitted back with the acknowledgment. The message transmitted in step 200 is limited to known i.e, authorized, communication unit IDs. At step 201, upon receiving the message from step 200, a communication unit with the ID specified in step 200 transmits an acknowledgment signal including its ID. At step 202, the transmitter of step 200 counts the number of acknowledgments it receives for each ID for which it sent a message in step 200, after waiting a reasonable time period to receive any acknowledgments. If, at step 203, no acknowledgment was received for that ID, the process continues with step 204 where a timer is set. When that time period for that timer expires, the unit transmits a message to that communication unit again. If, at step 203, one or more acknowledgments are received for the ID of step 200, the process continues with step 205. If no more than one acknowledgment was received, i.e., if only one acknowledgment was received, then new identification information is transmitted for programming into the communication unit at step 206, and the process ends.

If, at step 205, more than one acknowledgment is received for a particular ID, process continues with step 207. When more than one acknowledgment is received including one particular communication unit's ID, that ID is flagged as a potential unauthorized ID. That flag is sent to a system manager 111, which sends a response to the system, including instructions on how to deal with the potential unauthorized ID. At step 208, the response including instructions is received from a system manager 111, and the instructions are performed. That response may include disabling the potential unauthorized ID and/or any radio using the potential unauthorized ID, such as sending a message to the radio that will prohibit it from ever entering the system again, including a known and valid ID that whenever the system sees that ID coming in, that unit will automatically be ignored and all requests for resources will be denied. The potential unauthorized ID will be listed as an unauthorized ID from this time forward, and no further valid system information will be sent to that potential unauthorized ID. In addition, the unit may be reprogrammed to a default group, wherein that group is sent to hear a message such as "You are a scumbag, and you must leave the system immediately because you have been caught stealing valuable resources." Any unit in the default group is denied all access to the communication system. Because the request for acknowledgment is only sent to communication unit IDs that are known to be authorized, i.e., that within a known time period, only one acknowledgment is received for that particular unit, anybody who tries to clone (i.e., copy) a radio ID will find that their units are denied access to the communication system. If one of the units that happens to be authorized to use the communication system has its ID cloned, the unit will find out that its code is no longer accessible and will contact a system manager 111, who will give appropriate remedy to that user. Typically, such a remedy includes programming a new ID that is valid for that particular radio, as well as a warning that they should be careful that their radio not be cloned again at least by keeping an eye on it.

An alternative embodiment of the present invention in accordance with the flowchart of FIG. 2 includes using a unique radio identification code for each communication unit. Such a method involves transmitting a request for an acknowledgment via a wireless communication system to a communication unit, wherein the request includes a unique radio ID code of the communication unit. When only one acknowledgment is received from the request, a new unique radio ID code is transmitted to the communication unit having that unique radio ID code via the wireless communication system. The unique radio ID code within the radio is replaced with the new unique radio ID code transmitted to the communication unit. When more than one acknowledgment is received for a particular request for acknowledgment, the unique radio ID is flagged as a potential unauthorized ID. When no acknowledgment is received, and after waiting a predetermined time period, the request for an acknowledgment is retransmitted. The flagged unique ID code is sent to a system manager. A response including instructions is received from the system manager, and the instructions are performed. The instructions may comprise disabling a radio using the unique ID code and/or reprogramming the radio using the unique ID code to a default group and denying access by the radio to the wireless communication system.

An alternative method for detecting unauthorized communication units is described as follows, in accordance with the flowchart of FIG. 2. A new ID code message is transmitted, wherein the new ID code message includes a first identification code. A communication unit receives the new ID code message. The communication unit determines whether the first ID code substantially matches a stored ID code within the communication unit. When the first ID code substantially matches the stored ID code, an acknowledgment message is transmitted, wherein the acknowledgment message indicates that the new ID code message was received. Substantially matching of stored ID codes is determined by a system administrator, who determines if perfect matching, i.e., bit for bit, is required, if error-corrected IDs that match bit-for-bit are acceptable, or if one or more bits may be in error and the information is still considered matched. In the preferred embodiment, each bit of the stored ID must match the received information for a match to be deemed to have occurred. A central controller then determines whether more than one acknowledgment message is received for the first ID code. When more than one acknowledgment message is received, the first ID code is identified as a potential unauthorized ID code. When only one acknowledgment is received for the first ID code, a new ID code is transmitted to the communication unit via the wireless communication system. The new ID code may include a group ID and/or a unique ID, which is also referred to as an individual ID.

The present invention prevents unauthorized users from using information that is not targeted for unauthorized communication units. If a communication unit has restricted access to a message, then it will be that much more difficult for that unit to steal the information. Individuals wishing to steal such information will have to wait through endless radio transmissions to determine if the information that is desired is even within that parcel of information, let alone to find out if that is the particular information that they desire. Further, because many over-the-air reprogramming techniques are keyed off of the individual ID code, a unit may steal over the air reprogramming simply by copying that ID into its ID, resulting in, for example, numerous communication units with the same ID. Consequently, when that ID is reprogrammed, so are all the clones, i.e., the unauthorized users also gain access simply by having a stolen or copied ID. The present invention detects clones by detecting multiple copies of the same ID and denies any further valid system information to the ID.

What is claimed is:

1. A method comprising the steps of:

transmitting, via a wireless communication system, a request for an acknowledgment to a communication unit, wherein the request includes a unique identification (ID) code of the communication unit;

when only one acknowledgment is received for the unique ID code, transmitting, via the wireless communication system, a security code to the communication unit;

when more than one acknowledgment is received for the unique ID code,
  A) flagging the unique ID code as a potential unauthorized ID;
  B) transmitting a reprogramming instruction with the unique ID code, wherein the reprogramming instruction instructs any communication unit having the unique ID code to reprogram to a default group; and
  C) denying access by any communication unit in the default group to the wireless communication system.

2. The method of claim 1, further comprising the step of, when no acknowledgment is received, waiting a predetermined time period and retransmitting the request for an acknowledgment.

3. The method of claim 1, wherein the flagged unique ID code is sent to a system manager.

4. The method of claim 3, wherein a response including instructions is received from the system manager, and the instructions are performed.

5. The method of claim 4, wherein the instructions comprise disabling a radio using the unique ID code.

6. A method comprising the steps of:

transmitting, via a wireless communication system, a request for an acknowledgment to at least one communication unit, wherein the request includes a unique radio identification (ID) code of the at least one communication unit;

when only one acknowledgment from one communication unit is received from the request,
  A) transmitting, via the wireless communication system, a new unique radio ID code to the one communication unit; and
  B) replacing, by the communication unit, the unique radio ID code with the new unique radio ID code; and when more than one acknowledgment is received for the request,
  C) flagging the unique ID code as a potential unauthorized ID;
  D) transmitting a reprogramming instruction with the unique ID code, wherein the reprogramming instruction instructs any communication unit having the unique ID code to reprogram to a default group; and
  E) denying access by any communication unit in the default group to the wireless communication system.

7. The method of claim 6, further comprising the step of, when no acknowledgment is received, waiting a predetermined time period and retransmitting the request for an acknowledgment.

8. The method of claim 6, wherein the flagged unique ID code is sent to a system manager.

9. The method of claim 8, wherein a response including instructions is received from the system manager, and the instructions are performed.

10. The method of claim 9, wherein the instructions comprise disabling a radio using the unique ID code.

11. A method for detecting unauthorized communication units, the method comprising the steps of:

a) transmitting a new identification code message, wherein the new identification (ID) code message includes a first ID code;

b) receiving, by a communication unit, the new ID code message;

c) determining, by the communication unit, whether the first ID code substantially matches a stored ID code;

d) when the first ID code substantially matches the stored ID code, transmitting an acknowledgment message, wherein the acknowledgement message indicates that the new ID code message was received;

e) determining, by a central controller, whether more than one acknowledgment message is received for the first ID code;

f) when more than one acknowledgment message is received,
    A) identifying the first ID code as a potential unauthorized ID code;
    B) transmitting a reprogramming instruction with the first ID code, wherein the reprogramming instruction instructs any communication unit having the first ID code to reprogram to a default group; and
    C) denying access by any communication unit in the default group to the wireless communication system; and g) when only one acknowledgment is received for the first ID code, transmitting, via the wireless communication system, a new ID code to the communication unit.

12. The method of claim 11, wherein the new ID code includes a group ID.

13. The method of claim 11, wherein the new ID code includes a unique ID.

* * * * *